US006564073B1

(12) United States Patent
Uggmark et al.

(10) Patent No.: US 6,564,073 B1
(45) Date of Patent: May 13, 2003

(54) PORTABLE COMMUNICATION DEVICE AND A METHOD FOR DETERMINING THE POWER CONSUMPTION THEREOF

(75) Inventors: Johan Uggmark, Lund (SE); Charles Forsberg, Skurup (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/492,343

(22) Filed: Jan. 27, 2000

(30) Foreign Application Priority Data

Jan. 27, 1999 (SE) .............................................. 9900269

(51) Int. Cl.[7] .............................................. H04B 1/38
(52) U.S. Cl. ...................................... 455/573; 320/134
(58) Field of Search ................................ 324/427, 428; 320/134, 136; 455/574, 573, 343, 572

(56) References Cited

U.S. PATENT DOCUMENTS

| 4,261,037 A | * | 4/1981 | Hicks ..................... 324/103 R |
| 4,914,393 A | | 4/1990 | Yoshido |
| 5,248,929 A | | 9/1993 | Burke |
| 5,333,176 A | * | 7/1994 | Burke et al. ................... 379/58 |
| 5,455,499 A | * | 10/1995 | Uskali et al. ........ 320/DIG. 21 |
| 6,313,832 B1 | * | 11/2001 | Ishida ......................... 345/211 |

\* cited by examiner

*Primary Examiner*—Vivian Chin
*Assistant Examiner*—Tu Nguyen
(74) *Attorney, Agent, or Firm*—Nixon & Vanderhye P.C.

(57) ABSTRACT

A portable communication device (1) has a plurality of electronic circuits (212, 214, 216), a battery (270) for supplying power to the circuits, a controller (240) and a memory (244, 310). The controller controls the operation of at least some of the circuits by providing control signals (TX str, RX str, Synth str), for which the circuits are responsive. The memory (310) is provided with a set of predetermined consumption figures (TxCurrent, RxCurrent, SynthCurrent) related to a respective amount of electric energy consumed by the circuits (212, 214, 216) in response to a respective control signal. The device also comprises means (247, 300) for counting the control signals (TX str, RX str, Synth str) and for determining, by using the set of predetermined consumption figures, a value (Total_Current) representing the consumption of electric energy from the battery (270).

7 Claims, 3 Drawing Sheets

PORTABLE COMMUNICATION DEVICE AND A METHOD FOR DETERMINING THE POWER CONSUMPTION THEREOF

TECHNICAL FIELD

The present invention relates to a portable communication device, comprising a plurality of electronic circuits, a battery for supplying power to the circuits, a controller and a memory, the controller being arranged to control the operation of at least some of the circuits by providing control signals, for which the circuits are responsive. The invention also relates to a method of determining power consumption for such a portable communication device.

BACKGROUND ART

Users of portable battery-powered communication devices are dependent of a fully functional device. More specifically, the users need to know exactly for how long their devices will remain functional, until the electric energy stored in the battery has been consumed and the battery has to be recharged. This is particularly true for users of mobile telephones. Hence, for the rest of this document a mobile telephone is used, in a non-limiting sense, for exemplifying the inventive portable communication device and method.

In order to determine a precise estimation of the remaining operational time of the mobile telephone, the user needs an accurate and well-functioning battery capacity indicator or "fuel gauge". FIG. 1 illustrates a schematic mobile telephone 1 having a display 6, on which an icon 13 is presented as a battery capacity indicator. As shown in FIG. 1, the battery icon 13 indicates that approximately 25% remains of the initial battery charge. The mobile telephone 1 may have further display facilities for determining and indicating an estimated remaining time of operation, i.e. an estimation of the time left until the battery will have to be recharged.

Determining the remaining battery capacity basically includes two separate current measurements; one measurement for the current flowing into the battery (charging) and one measurement for the current consumed from the battery (discharging).

The charging current is often relatively easy to measure. A microprocessor (CPU) may read an A/D-converted signal, which is directly proportional to the current flowing through a small resistor. Since the microprocessor controls the charging process, it will also have access to all relevant data for calculating the total current, that has been supplied to the battery during a certain period of time.

Measuring the discharge current or current consumption, on the other hand, is much more difficult, particularly for advanced telephones with complex functionality and many operating modes. Traditionally, discharge current is measured by calculating the expected current consumption, when the telephone is in different operating modes. Earlier mobile telephones basically had two operating modes only; talk mode and standby mode. For such mobile telephones, the current consumption in talk mode and standby mode, respectively, was measured once in a test laboratory environment and stored in memory in the telephone as a respective predetermined consumption value. In operation, the telephone would keep track of the time spent in talk mode and in standby mode, respectively, and subsequently calculate the total amount of current consumed from the battery by multiplying the respective operational times with the predetermined consumption values.

Such an approach is disclosed in U.S. Pat. No. 5,248,929, wherein a microprocessor in the mobile telephone regularly executes an interrupt-driven software routine (once every 100 ms), during which the momentary operational mode is determined. The predetermined consumption values are read from memory, and the resulting power consumption value is added to an accumulated value, which in turn is used for determining remaining battery capacity and operational time in talk mode and standby mode.

Although providing an acceptable power consumption estimation for a simplified scenario with only two operating modes, the prior art approach described above has not proven applicable to more advanced telephones having a plurality of operational modes. For instance, the power consumption of a contemporary TDMA ("Time Division Multiple Access") telephone does not only depend of whether the telephone is in standby mode or talk mode; the power consumption is affected by at least the following conditions in standby mode and talk mode, respectively:

Standby Mode

Number of neighboring base stations

Paging frequency

Backlight

LCD icon mode on/off

Location update frequency

Top indicator

Accessory connected/disconnected

Talk Mode

Output power

Backlight

Band (900/1800/1900 MHz)

HR/FR/EFR (Half Rate/Full Rate/Enhanced Full Rate), i.e. speech encoder mode

HF algorithm

DTX/no DTX (Data Transmission)

DRX/no DRX (Data Reception)

Accessory connected/disconnected

A very large number of different operating modes may originate from various combinations of individual conditions above, and consequently there is an urgent need for an alternative way, other than the one described above, of determining battery power consumption.

SUMMARY OF THE INVENTION

The object of the present invention is to provide a new and substantially improved way of determining battery power consumption for a portable communication device, such as a mobile telephone.

Generally, the object has been achieved by the inventive realization that for any communication device, the different electronic circuits of which are controlled by submitting control signals from a central controller (such a microprocessor or CPU), prestored power consumption values for individual circuits may be predetermined and subsequently used by the controller for counting the occurrence of different control signals and calculating a total power consumption from the results of the count and the predetermined individual consumption values.

The invention is particularly well adapted for a TDMA telephone, which uses different control pulses or "strobes" for switching on and off different radio circuits, e.g. power amplifier, filters and synthesizer, as well as other electronic circuits, e.g. D/A converters. The strobes are all completely controlled by the microprocessor in such a way, that the telephone may send and receive in the correct timeslot.

More specifically, the object above has been achieved by a portable communication device and a method of determining the power consumption thereof according to the appended independent patent claims. Other objects, features and advantages of the present invention will appear from the following detailed disclosure, from the attached drawings as well as from the dependent claims.

BRIEF DESCRIPTION OF THE DRAWINGS

A preferred embodiment of the present invention will now be described in more detail, reference being made to the accompanying drawings, in which.

DETAILED DISCLOSURE OF A PREFERRED EMBODIMENT

Figure 1:
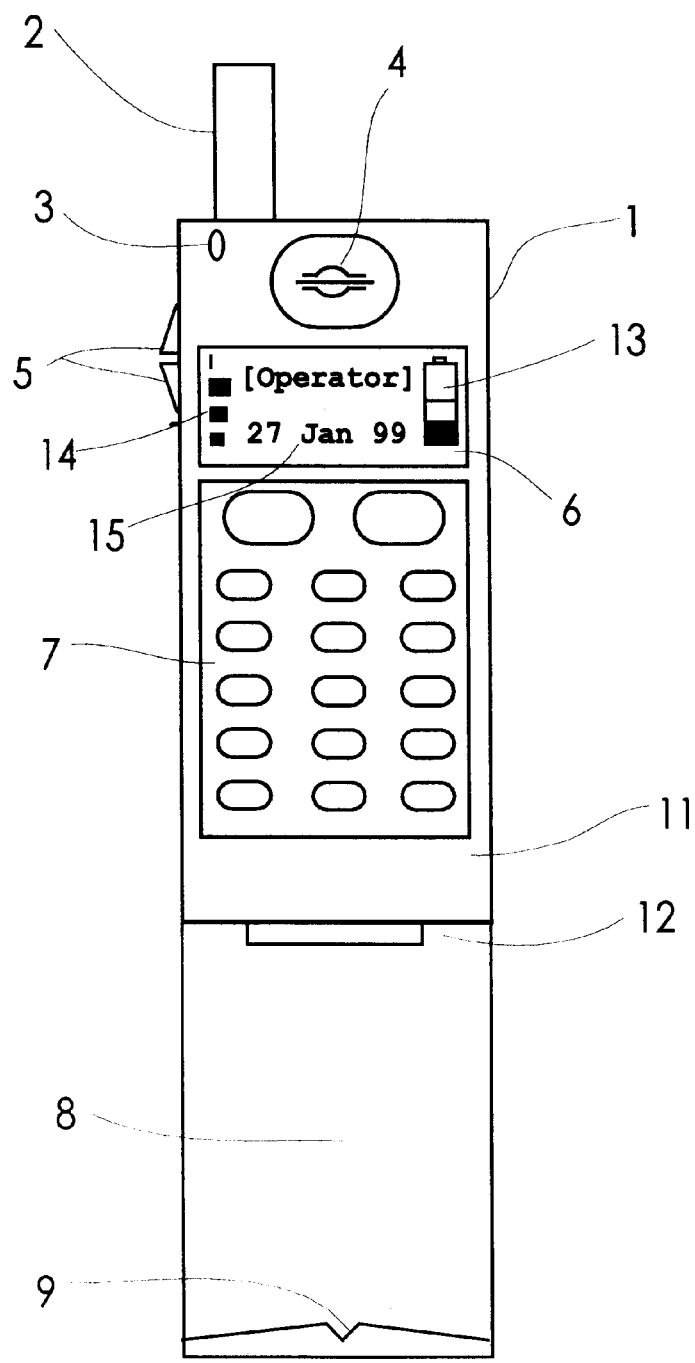
FIG. 1 is a schematic front view of a mobile telephone having a graphical indicator for remaining battery capacity.

A preferred embodiment of the present invention will now be described in detail by referring to a mobile telephone 1 shown in FIG. 1. However, as already mentioned, the present invention is equally applicable to all other portable communication devices, which fall under the definitions in the independent claims.

The mobile telephone 1 is a cellular GSM TDMA telephone and comprises an antenna 2, a top indicator 3 for indicating operational status, a speaker 4, volume adjustment buttons 5, a graphical display 6, a set of keys in a keypad 7, a flip 8, which is pivotally mounted to a telephone housing 11 by means of a hinge 12. The flip 8 has a speech opening 9 for receiving vocal acoustic energy from the user of the telephone. The acoustic energy is transmitted through the flip 8, via an internal sound guiding channel not shown in the drawing, to an internal microphone (not shown) in the telephone housing 11.

The display 6 comprises a signal strength indicator 14, a telephone operator indicator, a date indicator 15 and a remaining battery capacity indicator 13.

Figure 2:
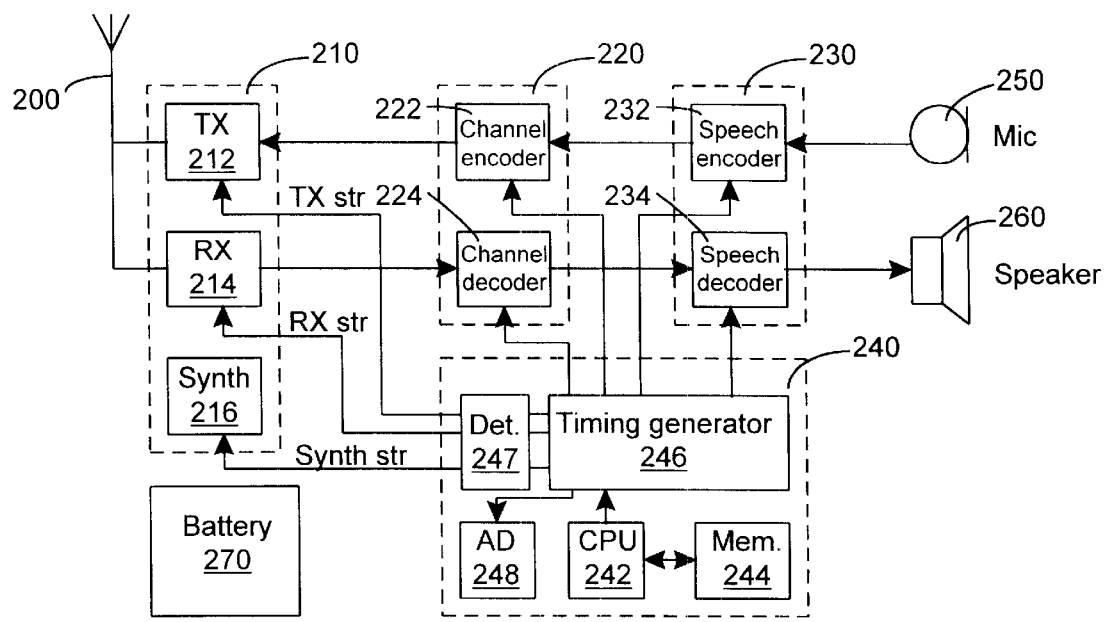
FIG. 2 is a schematic block diagram of the principal electronic and electric components of the mobile telephone shown in FIG. 1, FIG. 3 schematically illustrates a hardware implementation of part of the functionality of the preferred embodiment.

The principal electronic circuitry of the mobile telephone is illustrated in FIG. 2. From an overall point of view, the circuitry comprises an antenna 200, a radio block 210, a channel encoding/decoding block 220, a speech encoding/decoding block 230, a control block 240, a microphone 250, a speaker 260 and a battery 270. Except for the control block 240, all blocks 200, 210, 220, 230, 250, 260 and 270 have a design and structure, which are well-known and typical for a TDMA telephone commonly available on the market. Therefore, these blocks are only given a brief description below; the detailed architecture thereof is well-known to the skilled person.

The speech encoding/decoding block 230 comprises a speech encoder 232, an input of which is connected to an output of the microphone 250 and an output of which is connected to an input of a channel encoder 222 in block 220. An output of the channel encoder 222 is connected to an input of a transmitter 212, which is part of the radio block 210. An output of the transmitter 212 is connected to the antenna 200. Hence, in a well-known way the microphone 250 receives a spoken audible input from a user and converts it into a corresponding electric signal, which is supplied to the speech encoder 232. The speech encoder 232 applies either HR, FR or EFR speech encoding to the signal and supplies the result to the channel encoder 222, which performs channel encoding according to GSM TDMA standard. The output of the channel encoder 222 is fed to the transmitter 212, which comprises various electronic circuits, such as power amplifier, filters and mixers. The output of the transmitter 212 is a high-frequency TDMA signal in e.g. the 900 MHz band, which is supplied to the antenna 200 and emitted into open air as electromagnetic waves propagating from the antenna 200.

Correspondingly, an incoming TDMA signal is received at the antenna 200 and processed by a receiver 214 in the radio block 210. Basically, the operation of the receiver 214 is the inverse of that of the transmitter 212. An output of the receiver 214 is decoded in a channel decoder 224 in block 220 and is furthermore decoded by a speech decoder 234 in block 230. The output thereof is supplied to the speaker 260, which converts the electric signal into acoustic soundwaves to be emitted to the user.

The battery 270 is arranged to supply power to the various electronic circuits in modules 210, 220, 230 and 240. Preferably, the battery 270 is any commercially available rechargeable battery, such as a Li-ion or NiCd battery.

The control block 240 comprises a microprocessor or CPU (Central Processing Unit) 242, which is bidirectionally connected to a memory 244. Among other functions, the CPU 242 controls the various components in blocks 210, 220 and 230, as well as an A/D converter 248, by means of control signals indicated as unidirectional arrows in FIG. 2. More specifically, the components of the radio block 210, which consumes a majority of the total electric energy consumed from the battery 270, are controlled by the CPU 242 and an associated timing generator 246 by means of respective pulsed control signals or "strobes". Consequently, a "TX str" strobe is supplied by timing generator 246, under control from CPU 242, to the transmitter 212. Similarly, an "RX str" strobe controls the receiver 214, while a "Synth str" strobe controls a synthesizer 216. A separate strobe controls the A/D converter 248.

Up to this point, the architecture of the control block 240 as well as the operation thereof by way of different strobes are essentially identical to a standard GSM TDMA telephone.

According to the preferred embodiment, the control block 240 is provided with a strobe detector 247, which is arranged to detect the occurrence of strobes (i.e. control pulses having the purpose of switching specific circuits on and off) submitted by the timing generator 246 on individual control lines, which extend between the timing generator 246 and the transmitter 212, receiver 214 and synthesizer 216 of the radio block 210. The purpose of the strobe detector 247 is to count the number of TX strobes, RX strobes and Synth strobes. As will be described in more detail below, the counted values will be used by the CPU 242 to determine a total consumption of power from the battery 270.

Before providing a detailed description of the functions of the strobe detector 247 and the CPU 242 for determining aforesaid total power consumption value, the inventive concept of using control pulses or strobes for the purpose of determining power consumption will be discussed next.

As already mentioned, a TDMA telephone uses a number of control pulses or strobes, which are used to switch on and off i.a. various radio circuits. The strobes are all completely controlled by the CPU 242 in such a way, that the telephone is capable of sending and receiving in the correct TDMA timeslot. For instance, the TX strobe is activated at least once for each TDMA frame in order to switch on transmitter 212 and the components comprised therein, such as the power amplifier (PA). The transmitter is activated, by the TX strobe, just before the correct timeslot and is then deactivated immediately after this timeslot, by switching the TX strobe from e.g. a high logical value to a low logical value. In normal talk mode, i.e. for a voice call, the TX strobe is generated exactly once in every TDMA frame by the CPU 242 and the timing generator 246, for as long as the ongoing telephone call lasts. In case of a data call (DTX), on the other hand, the number of TX strobes may be two or more (multislot) in each TDMA frame.

Now, since the TX strobe activates/deactivates a well-defined set of electronic circuits in the transmitter 212, and since the individual power consumption of each of these circuits is well-known and/or may be accurately measured once and for all in a test laboratory environment, the TX strobe is associated, according to the invention, with a predetermined specific current consumption value, representing the current consumed by all relevant transmitter circuits upon activation by one TX strobe.

Consequently, by counting the number of times that the TX strobe occurs, the total power consumption, caused by TX strobes during a given period of time, may easily be calculated by multiplying the result of the count with the predetermined power consumption value per TX strobe.

As an important advantage, the inventive scheme described above will be completely independent of whether the telephone has been used for a voice call (involving exactly one TX strobe per TDMA frame) or a data call (multislot; possibly involving more than one TX strobe per TDMA frame). The detector 247 will simply keep track of all TX strobes, irrespective of in what frames they may appear.

The above reasoning is applicable also to the RX strobe and the Synth strobe. Furthermore, it may be applied to other control pulses or strobes, such as an A/D strobe for controlling the A/D converter 248.

Figure 3:
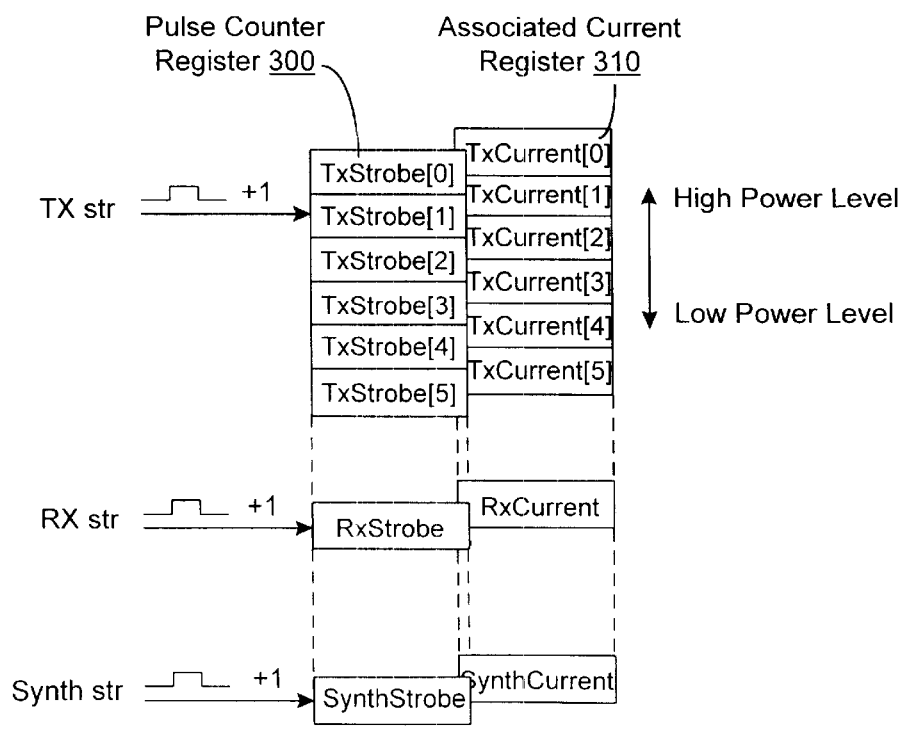

Returning to the detailed description of the preferred embodiment, the strobe detector 247 comprises a pulse counter register 300 shown in FIG. 3. Since the power consumption during a TX strobe depends on the momentary power level of the transmission, the pulse counter register 300 comprises a plurality, or n, of memory cells TxStrobe [0], TxStrobe[1], TX Strobe[2], . . . TxStrobe[n−1]. Furthermore, the pulse counter register 300 comprises one memory cell RxStrobe and one cell SynthStrobe for the control pulse (RX str) to the receiver 214 and the control pulse (Synth str) to the synthesizer 216, respectively.

Initially, all memory cells are cleared, i.e. set to 0. Then, each time a TxStrobe is generated by the timing generator 246, the strobe detector 247 will increase the memory contents at memory cell TxStrobe[i], where i corresponds to the momentary transmission power level. Correspondingly, the memory contents at memory cell RxStrobe will be incremented when detecting an RX strobe, and the memory contents at memory cell SynthStrobe will be incremented following a Synth strobe.

As already mentioned, a current consumption value is associated with each type of strobe, or more particularly with each memory cell in the pulse counter register 300. These current consumption values represent the respective amount of current consumed by relevant electronic circuits upon activation by the type of strobe in question and are stored in an associated current register 310. The register 310 may be located within the strobe detector 247, preferably implemented as an EEPROM memory, or alternatively the associated current register 310 may be stored in the conventional memory 244.

Figure 4:
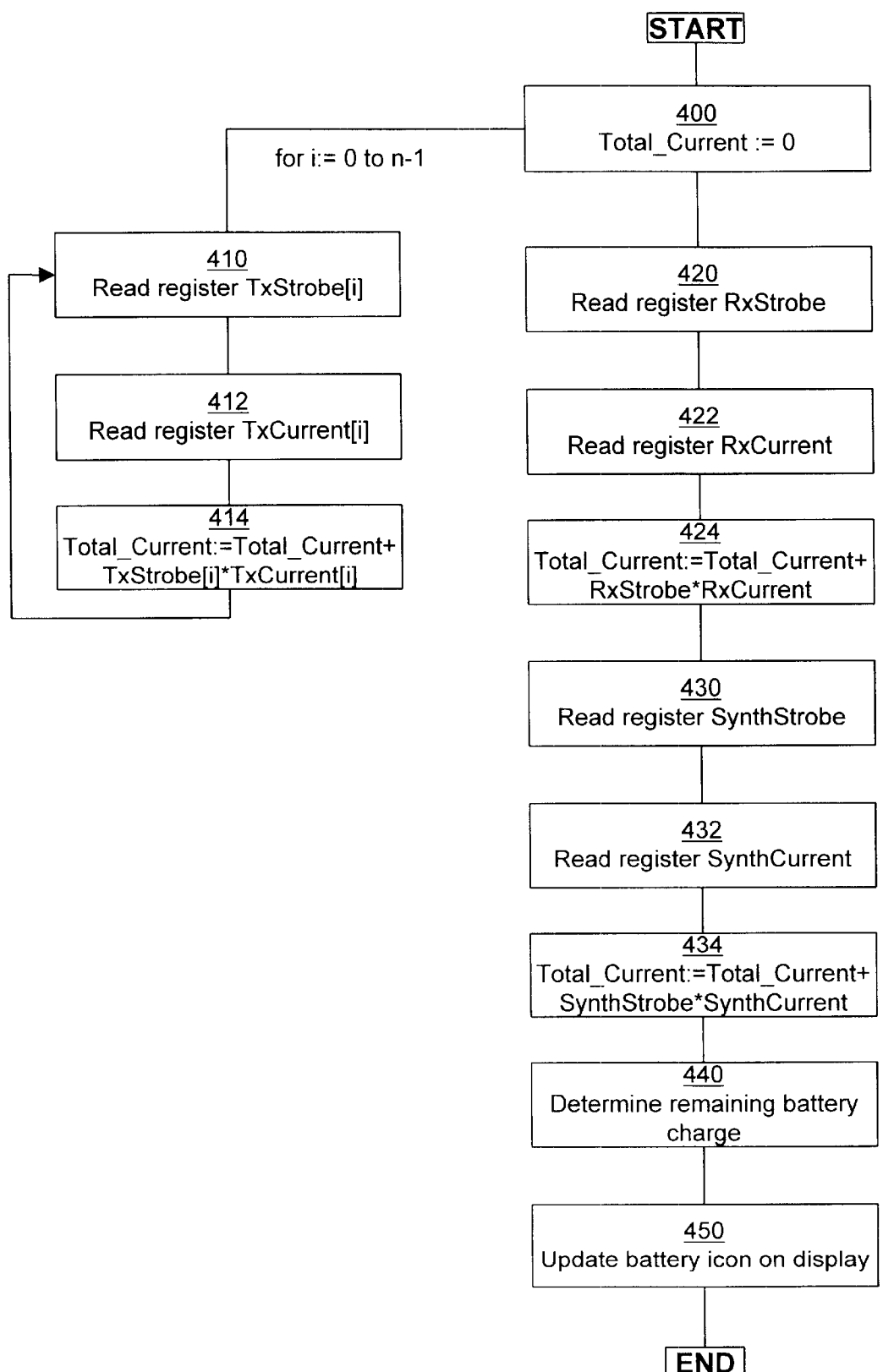
FIG. 4 is a flow chart of another part of the functionality of the preferred embodiment, which is implemented in software.

FIG. 4 illustrates an algorithm for determining a total power consumption from the battery 270 by means of the strobe count results obtained by strobe detector 247. According to the preferred embodiment, the algorithm is implemented as a software routine stored in memory 244 and executed by CPU 242. Upon initialization, a Total_Current variable is cleared (set to 0) in a first step 400. Next, a loop comprising steps 410, 412 and 414 is executed n times in order to scan all memory cells in pulse counter register 300, which are related to TX strobes. In step 410, the memory content at cell TxStrobe[i] is read, where i is iterated from 0 to n−1. In step 412, the corresponding contents at register TxCurrent[i] is read, revealing the predetermined power consumption value associated with a TX strobe of power level i. Subsequently, in step 414, the variable Total_Current is incremented by the result of TxStrobe[i] multiplied by TxCurrent[i]. If i is less than n−1, i is incremented by 1 and the control is returned to step 410. Otherwise, the control is transferred to a step 420, wherein the memory contents at register RxStrobe is read, followed by reading register RxCurrent in a step 422. In a step 424, Total_Current is incremented by RxStrobe multiplied by RxCurrent.

Subsequently, the corresponding operations are performed in steps 430–434 for register SynthStrobe, i.e. registers SynthStrobe and SynthCurrent are read, and the result of the multiplication thereof is added to Total_Current. Hence, following the termination of step 434, the variable Total_Current holds a calculated value of the total power consumption from the battery 270.

By subtracting the value of Total_Current from an initial or previous value of the total battery current available in the form of electric energy stored in the battery 270, the remaining battery charge may be determined in a step 440. Next, the battery icon 13 (FIG. 1) is updated on the display 6 of the mobile telephone 1 to reflect the calculated change in remaining battery charge.

The procedure above, which has been described in relation to three different strobes (TX strobe, RX strobe and Synth strobe), may be extended to other strobes and circuits, such as the A/D converter 248, the channel encoder 222, the channel decoder 224, the speech encoder 232 and the speech decoder 234. The strobes described above all have a fix length in time and may consequently be stored, as described above, in the form of current consumption values (expressed in mAh). However, for strobes that are variable in length, the predetermined power consumption values may be stored as charge consumption values (in mA), and the individual duration of such variable-length strobes will be determined by the CPU 242 or the strobe detector 247. For instance, such a variable strobe length may be determined by adding a signal with a well-known frequency in a register during the duration of the individual strobe. Upon execution of the procedure for determining total power consumption shown in FIG. 4, the content of such a register directly represents the total time during which the particular strobe has been active. By simply multiplying this time with the associated charge consumption value, the power consumption related to the strobe may be determined.

The invention has been described above with reference to a preferred embodiment. However, the present invention shall in no way be limited by the description above; the scope of the invention is best defined by the appended independent claims. Other embodiments than the particular one described above are equally possible within the scope of the invention. For instance, even if according to the preferred embodiment the determination of the total power consumption is determined in both hardware (strobe detector 247) and software (routine executed by the CPU 242), the scheme may be implemented solely in hardware, solely in software or partly in software and partly in hardware.

What is claimed is:

1. A portable communication device comprising:

a plurality of electronic circuits, a battery for supplying power to the electronic circuits, a controller and a memory, wherein the controller is arranged to control the operation of at least some of the electronic circuits by providing control signals to which the electronic circuits are responsive;

wherein the memory is provided with a set of predetermined consumption figures related to respective amounts of electric energy consumed by the electronic circuits in response to respective control signals; and means for counting the control signals from the controller used to control the electronic circuits and for determining based upon a number count of the control signals, by using the set of predetermined consumption figures, a value representing consumption of electric energy from the battery.

2. A portable communication device as defined in claim 1, characterized in that it is a mobile telephone (1), preferably a TDMA telephone.

3. A portable communication device according to claim 1, wherein said circuits comprise a radio transmitter (212).

4. A portable communication device according to claim 1, wherein said circuits comprise a radio receiver (214).

5. A portable communication device according to claim 1, wherein said circuits comprise a synthesizer (216).

6. A method of determining power consumption for a portable battery-powered communication device comprising a controller and electronic circuits, at least some of the electronic circuits being responsive to control signals from said controller, the method comprising:

determining respective numbers of occurrence of said control signals from the controller to the electronic circuits, reading predetermined consumption values related to the power consumed by the electronic circuits in response to a respective control signal(s), and determining power consumption for the device from said numbers of occurrence of the control signals from the controller to the electronic circuits and from said predetermined consumption values.

7. A method according to claim 6, wherein the communication device is a mobile telephone.

* * * * *